(12) United States Patent
Tsur

(10) Patent No.: US 9,098,206 B1
(45) Date of Patent: Aug. 4, 2015

(54) BI-DIRECTIONAL QUEUE

(71) Applicant: Marvell Israel (M.I.S.L.) Ltd., Yokneam (IL)

(72) Inventor: Oded Tsur, Kiryat-ono (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 195 days.

(21) Appl. No.: 13/851,819

(22) Filed: Mar. 27, 2013

Related U.S. Application Data

(60) Provisional application No. 61/616,921, filed on Mar. 28, 2012, provisional application No. 61/659,282, filed on Jun. 13, 2012.

(51) Int. Cl.
*G06F 12/16* (2006.01)
*G06F 3/06* (2006.01)

(52) U.S. Cl.
CPC .............. *G06F 3/0647* (2013.01); *G06F 3/067* (2013.01)

(58) Field of Classification Search
None
See application file for complete search history.

(56) References Cited

U.S. PATENT DOCUMENTS 5,127,000 A * 6/1992 Henrion .................... 370/394

* cited by examiner

*Primary Examiner* — Duc Doan

(57) ABSTRACT

Some of the embodiments provide a queue comprising a plurality of memory cells arranged in a first column and a second column, the plurality of memory cells also arranged in a plurality of levels, such that ones of the levels include a corresponding memory cell of the first column and a corresponding memory cell of the second column, such that a memory cell of the first column is coupled to at least (i) another memory cell of the first column that is at a different level than a level of the memory cell of the first column and (ii) another memory cell of the second column that is at a same or a different level than the level of the memory cell of the first column; and a control module to selectively add data, selectively remove data, and selectively transfer data between the memory cells of the queue.

20 Claims, 8 Drawing Sheets

200

|  | Push left | Pop left | Push right | Pop right | Operation flag |
|---|---|---|---|---|---|
| Row 1 | 0 | 0 | 0 | 0 | Stay |
| Row 2 | 0 | 0 | 0 | 1 | Right up |
| Row 3 | 0 | 0 | 1 | 0 | Right down |
| Row 4 | 0 | 0 | 1 | 1 | Stay |
| Row 5 | 0 | 1 | 0 | 0 | Left up |
| Row 6 | 0 | 1 | 0 | 1 | Up |
| Row 7 | 0 | 1 | 1 | 0 | Rotate left |
| Row 8 | 0 | 1 | 1 | 1 | Left up |
| Row 9 | 1 | 0 | 0 | 0 | Left down |
| Row 10 | 1 | 0 | 0 | 1 | Rotate right |
| Row 11 | 1 | 0 | 1 | 0 | Down |
| Row 12 | 1 | 0 | 1 | 1 | Left down |
| Row 13 | 1 | 1 | 0 | 0 | Stay |
| Row 14 | 1 | 1 | 0 | 1 | Right up |
| Row 15 | 1 | 1 | 1 | 0 | Right down |
| Row 16 | 1 | 1 | 1 | 1 | Stay |

Fig. 2

BI-DIRECTIONAL QUEUE

CROSS REFERENCE TO RELATED APPLICATIONS

The present disclosure claims priority to U.S. Provisional Patent Application No. 61/616,921, filed on Mar. 28, 2012, and to U.S. Provisional Patent Application No. 61/659,282, filed on Jun. 13, 2012, both of which are incorporated herein by reference.

TECHNICAL FIELD

Embodiments of the present disclosure relate to computing systems, and more particularly, to queues for queuing data packets.

BACKGROUND

Unless otherwise indicated herein, the approaches described in this section are not prior art to the claims in the present disclosure and are not admitted to be prior art by inclusion in this section.

A queue, which queues data packets, can be configured to operate, for example, as a first-in first-out (FIFO) queue, or as a last-in first-out (LIFO) queue. In a FIFO queue, data packets that entered the queue first leave the queue first, i.e., the data packets leave the queue in an order in which the data packets arrived at the queue. On the other hand, in a LIFO queue, data packets that entered the queue last leave the queue first, i.e., the data packets leave the queue in an order that is opposite to an order in which the data packets arrived at the queue.

SUMMARY

In an embodiment, there is provided a queue comprising a plurality of memory cells arranged in a first column of memory cells and a second column of memory cells, the plurality of memory cells also arranged in a plurality of levels, such that ones of the levels include a corresponding memory cell of the first column and a corresponding memory cell of the second column, and such that a memory cell of the first column is coupled to at least (i) another memory cell of the first column that is at a different level than a level of the memory cell of the first column and (ii) another memory cell of the second column that is at a same or a different level than the level of the memory cell of the first column; and a control module configured to selectively add data to queue, selectively remove data from the queue, and selectively transfer data between the memory cells of the queue.

In an embodiment, there is also provided a method comprising arranging a plurality of memory cells of a queue in (i) a first column of memory cell's and a second column of memory cells and (ii) a plurality of levels, such that ones of the levels include a corresponding memory cell of the first column and a corresponding memory cell of the second column, and such that a memory cell of the first column is coupled to at least (i) another memory cell of the first column that is at a different level than a level of the memory cell of the first column and (ii) another memory cell of the second column that is at a same or a different level than the level of the memory cell of the first column; selectively adding data to queue; selectively transferring data between the memory cells of the queue; and selectively removing data from the queue.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be noted that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

FIG. 2 illustrates a table that provides values of an operation flag, based on various commands issued for the queue of FIG. 1.

DETAILED DESCRIPTION

Figure 1:
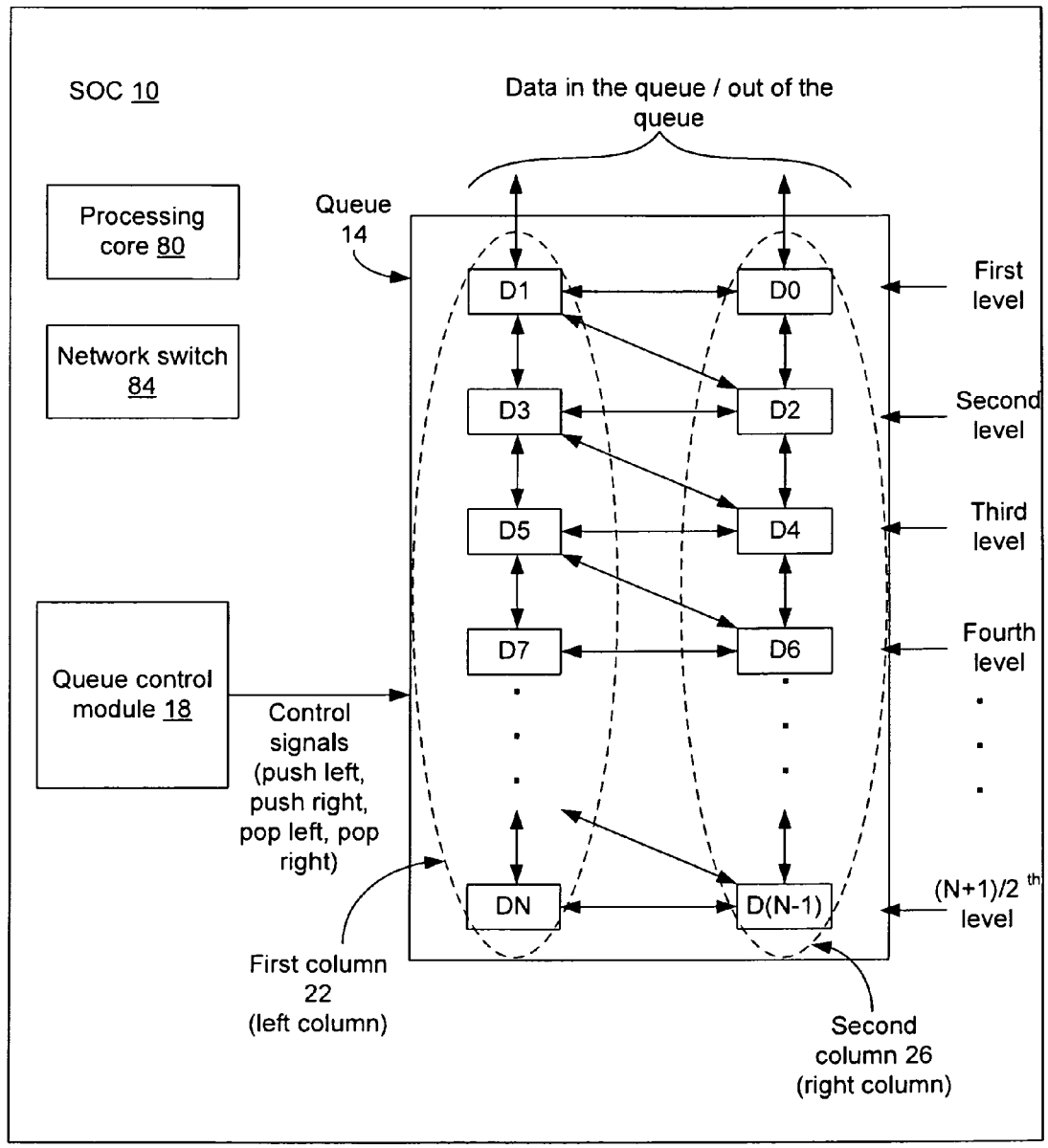
FIG. 1 schematically illustrates a system on a chip (SoC) comprising a queue, in accordance with an embodiment of the current disclosure.

FIG. 1 schematically illustrates a system on a chip (SoC) 10 comprising a queue 14, in accordance with an embodiment of the disclosure. The queue 14 comprises a plurality of memory cells D0, D1, . . . DN, where N is an odd positive integer. Thus, there are (N+1) number of memory cells (i.e., an even number of memory cells) in the queue 14, divided into pairs of memory cells. The memory cells D0, D1, . . . DN are configured to form (i) a first column 22 of memory cells and (ii) a second column 26 of memory cells (in FIG. 1, ones of the first column 22 and the second column 26 are illustrated using respective dotted lines). For example, the first column 22 of memory cells comprises memory cells D1, D3, D5, . . . DN (i.e., the odd numbered memory cells), and the second column 26 of memory cells comprises memory cells D0, D2, D4, D6, . . . , D(N−1) (i.e., the even numbered memory cells). In FIG. 1, the first column 22 of memory cells is labeled as a left column, and the second column 26 of memory cells is labeled as a right column, although such labeling are merely for purposes of identification, and do not limit the scope of this disclosure.

Furthermore, the memory cells D0, D1, . . . DN are divided in a plurality of levels (e.g., (N+1)/2 number of levels). For example, a first level of memory cells includes memory cells D0 and D1; a second level of memory cells includes memory cells D2 and D3; a third level of memory cells include memory cells D4 and D5; an $(N+1)/2^{th}$ level of memory cells include memory cells D(N−1) and DN; and so on, as illustrated in FIG. 1. That is, each level of memory cells includes a pair of memory cells, e.g., with one memory cell from the first column 22 and one memory cell from the second column 26. For purposes of discussion, it is assumed, unless otherwise stated, that the first level is a higher level than the second level, the second level is a higher level than the third level, the third level is a higher level than the fourth level, and so on, although such an assumption does not limit the scope of this disclosure.

In an embodiment, the memory cells D0 and D1 receive data from, and transmit data to one or more components that are external to the queue 14. Furthermore, the memory cell D0 is communicatively coupled to the memory cells D1 and D2. The memory cell D1 is communicatively coupled to the memory cells D0, D3 and D2. Thus, ones of the memory cells D0 and D1 are communicatively coupled to (i) one memory cell of the same column and of a different level and (ii) at least one memory cell of another column.

For memory cells of the second, third, fourth, . . . , ((N+1)/2−1) levels, a memory cell of a given level is communicatively coupled to (i) a memory cell of the same column and of a higher level, (ii) a memory cell of the same column and of a lower level, (iii) a memory cell of a different column and of the same level, and (iv) a memory cell of the different column and of a different level, as illustrated in FIG. 1. For example, the memory cell D3 of the first column and the second level is communicatively coupled to (i) the memory cell D1 of the same first column and of the higher first level, (ii) the memory cell D5 of the same first column and of the lower third level, (iii) the memory cell D2 of a different (i.e., second) column and of the same second level, and (iv) the memory cell D4 of the different (i.e., second) column and of a different (i.e., third) level. In another example, the memory cell D2 of the second column and the second level is communicatively coupled to (i) the memory cell D0 of the same second column and of the higher first level, (ii) the memory cell D4 of the same second column and of the lower third level, (iii) the memory cell D3 of a different (i.e., first) column and of the same second level, and (iv) the memory cell D1 of the different (i.e., first) column and of a different (i.e., first) level. Similarly, other memory cells are also communicatively coupled in, for example, the arrangement illustrated in FIG. 1.

When two memory cells of the queue 14 are communicatively coupled, the memory cells can bi-directionally transfer data between the two memory cells. For example, the memory cells D3 and D4 are communicatively coupled, implying that the memory cell D3 can transmit data to the memory cell D4, and the memory cell D4 can transmit data to the memory cell D3.

In an embodiment, the SoC 10 further comprises a queue control module 18 configured to control the queue 14. For example, the queue control module 18 transmits control signals to the queue 14, based on which the queue 14 transmits data between various memory cells of the queue 14. For example, based on the control signals received from the queue control module 18, the queue 14 receives new data, outputs data, communicates data between various memory cells, and/or the like, as will be discussed in more detail herein later.

In an embodiment, the SoC 10 further comprises one or more processing cores (e.g., processing core 80), one or more network devices (e.g., a network switch 84 configured to transmit data to, and/or receive data from a network that is external to the SoC 10, one or more network servers, one or more network gateways, etc.), and/or the like. In an example, the processing core 80, the network switch 84 and/or any other appropriate component of the SoC 10 transmit data to the queue 14 (e.g., for queuing in the queue 14), and/or receive data from the queue 14.

As will be discussed in more detail herein later, in an embodiment, due to the arrangement of the memory cells in the queue 14, the queue 14 can be configured to act as a bi-directional queue, e.g., which can receive data at any of two of the memory cells (e.g., memory cells D0 and D1) and selectively output data at any of two of the memory cells of the queue 14 in a configurable sequence. For example, the queue 14 can be configured to act as a FIFO queue, to selectively output at least some of the data packets that were first input in the queue 14 (e.g., the data packets leave the queue 14 in an order at which the data packets arrived at the queue 14). The queue 14 can also be configured to act as a LIFO queue, to selectively output at least some of the data packets that were last input in the queue 14 (e.g., the data packets leave the queue 14 in an order that is opposite to an order at which the data packets arrived at the queue 14). In an embodiment, the entries in the queue 14 can also be re-ordered within the queue 14, e.g., to change an order in which the entries are arranged in the queue 14 (e.g., the data packets leave the queue 14 in an order that is neither same, nor the opposite of the order at which the data packets arrived at the queue 14). Such selective configuration of the queue 14 (e.g., re-ordering of the data packets within the queue 14) is possible due to, for example, the arrangement of the memory cells in the queue 14 (e.g., the memory cells are arranged in two columns and various levels, and are selectively interconnected, as illustrated in FIG. 1), and the manner in which data is transmitted between various memory cells of the queue 14, as will be discussed in more detail herein later.

In an embodiment and although not illustrated in FIG. 1, respective ones of the memory cells of the queue 14 include, or are otherwise associated with a corresponding valid bit. For example, the memory cell D0 is associated with a valid bit V0, the memory cell D1 is associated with a valid bit V1, the memory cell DN is associated with a valid bit Vn, and so on. In an embodiment, the valid bit is stored in a register (e.g., a one bit register) that is included in, or otherwise associated with the corresponding memory cell.

In an embodiment, the valid bit associated with a memory cell is (e.g., which is stored in the memory cell, or stored elsewhere but is associated with the memory cell, not illustrated in FIG. 1), for example, a one bit flag that indicates whether the corresponding memory cell stores valid data. For example, a value of 1 for the valid bit V1 (i.e., while the valid bit V1 is asserted) indicates that the memory cell D1 stores valid data; and a value of 0 for the valid bit V1 (i.e., while the valid bit V1 is de-asserted) indicates that the memory cell D1 does not store valid data (e.g., stores data that is invalid, or meaningless, or that the memory cell D1 is empty).

For ease of notation and unless otherwise stated, a valid bit accompanied by a single prime mark (') indicates that the valid bit is asserted and the corresponding memory cell stores valid data; and a valid bit accompanied by a double prime mark (") indicates that the valid bit is de-asserted and the corresponding memory cell does not store valid data (e.g., is empty). For example, a valid bit V1' indicates that the corresponding memory cell D1 stores valid data and the valid bit V1 is asserted; and a valid bit V1" indicates that the corresponding memory cell D1 does not store valid data and the valid bit V1 is de-asserted.

As previously discussed, data is received (e.g., from the processing core 80, the network switch 84, and/or the like) in the memory cells D0 and/or D1 of the queue 14, and are also output by the memory cells D0 and/or D1 of the queue 14. That is, the memory cells D0 and D1 receive data from outside the queue 14, and output data to outside the queue 14. Unless otherwise specified, a "push" implies receiving data in the queue 14, and a "pop" implies outputting data from the queue. Also, pushing or popping data "right" implies that data is pushed to, or popped from the right column, i.e., by the memory cell D0. Similarly, pushing or popping data "left" implies that data is pushed to, or popped from the left column, i.e., by the memory cell D1.

For example, data can be input to the queue 14 using a "push right" command, by which data is input (i.e., pushed in from outside the queue 14) to the memory cell D0. Similarly, data can be input to the queue 14 using a "push left" command, by which data is input to the memory cell D1 (i.e., pushed in from outside the queue 14). Also, data can be output by the queue 14 using a "pop right" command, by which data is output from the memory cell D0 (e.g., to a component external to the queue 14). Similarly, data can be output from the queue 14 using a "pop left" command, by which data is output from the memory cell D1. Thus, data is received in, or output by the queue 14 based on a push right command, a push left command, a pop right command, and/or a pop left command. It is noted that the terminologies "push," "pop," "left," and "right" are merely examples, and other appropriate terminologies may also be used.

In an embodiment, at any given clock cycle, one or more of the push right command, push left command, pop right command, and the pop left command can be issued by the queue control module 18. As an example, during a clock cycle, the queue control module 18 can issue a push right and pop left command, implying that during the clock cycle, (i) data is input to the memory cell D0 and (ii) data is output from the memory cell D1.

In an embodiment, the push right, push left, pop right, and/or the pop left commands are associated with an operation flag. For example, the operation flag can take one of various possible values, based on whether one or more of the push right, push left, pop right, and/or the pop left commands are issued for the queue 14 during a clock cycle. For example, the operation flag can take of several possible values, where the several possible values comprise stay, up, down, right up, right down, left up, left down, rotate left, and rotate right. These values of the operation flag determine the manner in which data is to be transmitted between various memory cells of the queue 14, as will be discussed in detail herein later.

FIG. 2 illustrates a table 200 that provides values for the operation flag, based on various commands issued for the queue 14. The table 200 has 16 rows, corresponding to 16 different combinations of the push right, push left, pop right, and/or the pop left commands. For a given row of the table 200, a value of 1 corresponding to a command indicates that the command is issued, and a value of 0 corresponding to a command indicates that the command is not issued.

For example, row 1 of the table 200 indicates that when none of the push right, push left, pop right, and the pop left commands are issued during a clock cycle, the operation flag takes a value of stay. In another example, row 2 of the table 200 indicates that when only the pop right command is issued during a clock cycle, the operation flag takes a value of right up. In yet another example, row 4 of the table 200 indicates that when the pop right and the push right commands are issued during a clock cycle, the operation flag takes a value of stay. Various other rows of the table 200 similarly indicate example values of the operation flag for various combinations of the push right, push left, pop right, and/or the pop left commands.

Figure 3:
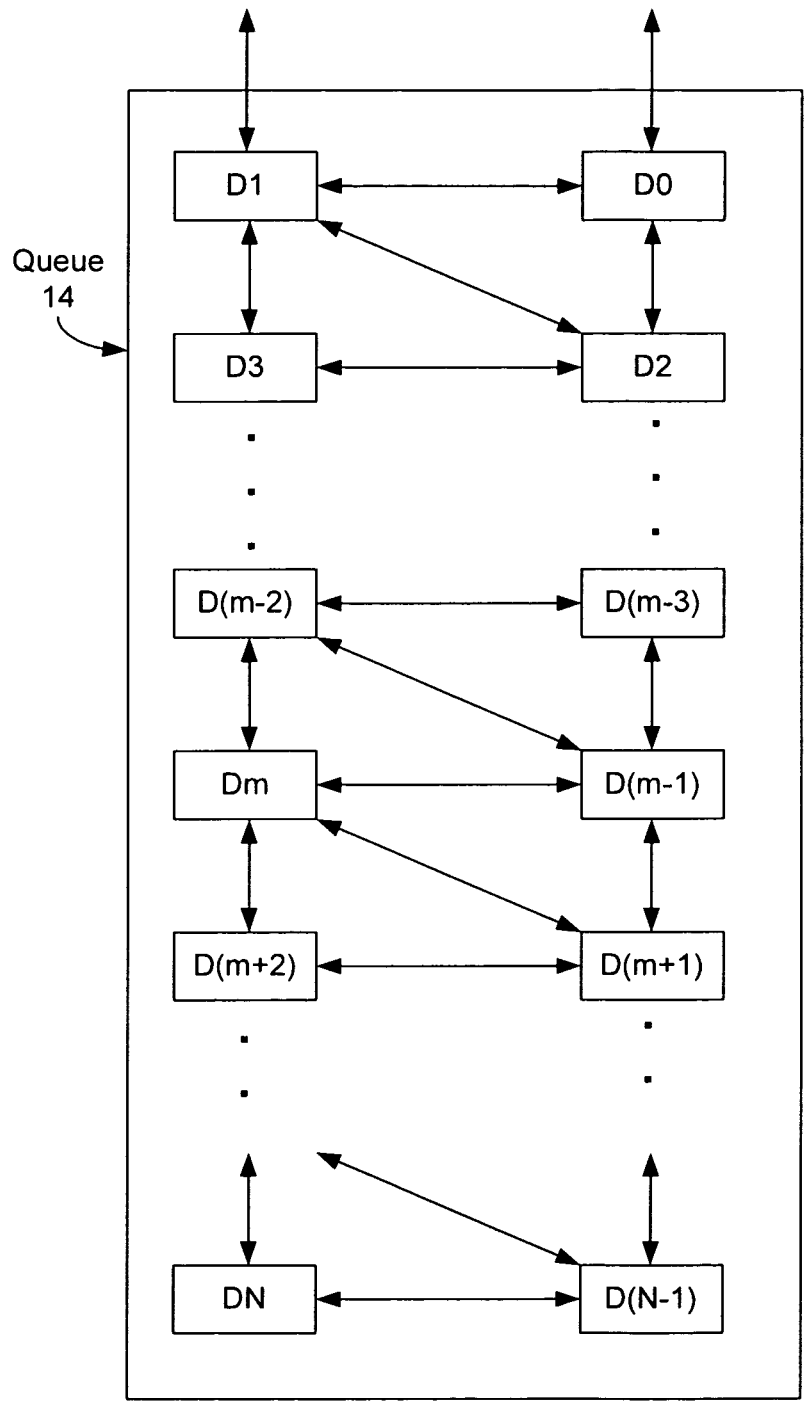
FIG. 3 illustrates the queue of FIG. 1 in more detail.

FIG. 3 illustrates the queue 14 of FIG. 1 in more detail. The queue 14 includes memory cells D0, D1, . . . , D(m−3), D(m−2), . . . , D(m+2), . . . , DN, as illustrated in FIG. 3, where m is an odd integer. As discussed, each of the memory cells of the queue 14 is associated with a valid bit. For example, the memory cell D(m−3) is associated with a valid bit V(m−3), the memory cell D(m−2) is associated with a valid bit V(m−2), and so on. Also, as an example and as previously discussed, a valid bit V(m−3)' indicates that the corresponding memory cell D(m−3) stores valid data (i.e., the valid bit V(m−3) is asserted); and a valid bit V(m−3)" indicates that the corresponding memory cell D(m−3) does not store valid data (i.e., the valid bit V(m−3) is de-asserted and the memory cell D(m−3) is empty).

The following algorithm (i.e., Algorithm 1) illustrates example data transmission from various memory cells to an example memory cell D(m−1). The algorithm can be generalized for any appropriate value of m (e.g., generalized for data transmission from various memory cells to a given cell in the right column of the queue 14).

Algorithm 1 (Associated with Data Transmission from Various Memory Cells to an Example Memory Cell D(m−1) of the Right Column of the Queue 14)

A. Data to be transferred from memory cell D(m−3) to D(m−1) if
  (i) the operation flag is down, OR
  (ii) the operation flag is right down, OR
  (iii) valid bit D(m−1)' and the operation flag is rotate left;

B. Data to be transferred from memory cell D(m−2) to D(m−1) if
  (i) valid bit V(m−1)" and the operation flag is left down, OR
  (ii) valid bit V(m−1)' and valid bit Vm" and the operation flag is rotate right;

C. Data to be transferred from memory cell Dm to D(m−1) if
  (i) valid bit V(m+1)" AND
  (ii) valid bit Vm AND
  (iii) operation flag rotate right or operation flag right up;

D. Data to be transferred from memory cell D(m+1) to D(m−1) if
  (i) operation flag up OR
  (ii) valid bit V(m+1) AND (operation bit rotate right or right up);

E. Data to be transferred from memory cell D(m−1) to D(m−1) (i.e., data in the memory cell D(m−1) stays the same) otherwise.

Thus, the Algorithm 1 specifies various conditions for transfer of data to the memory cell D(m−1) from another memory cell during a given clock cycle. For example, the condition A of the Algorithm 1 specifies that data is to be transferred from the memory cell D(m−3) to the memory cell D(m−1) if (i) the operation flag is down, OR (ii) the operation flag is right down, OR (iii) valid bit (Dm−1)' (i.e., the valid bit D(m−1) indicates that the corresponding memory cell D(m−1) stores valid data) and the operation flag is rotate left. The value of the operation flag is determined from the table 200 of FIG. 2. Similarly, the conditions B, C, D and E of the Algorithm 1 specifies various other conditions for transfer of data from various memory cells to the memory cell D(m−1).

The following algorithm (i.e., Algorithm 2) illustrates example data transmission from various memory cells to an example memory cell Dm in the left column of the queue 14. The algorithm can be generalized for any appropriate value of m (e.g., generalized for data transmission from various memory cells to a given cell in the left column of the queue 14).

Algorithm 2 (associated with data transmission from various memory cells to the example memory cell Dm in the left column of the queue 14)

A1. Data to be transferred from memory cell D(m−2) to Dm if
  (i) the operation flag is down, OR
  (ii) valid bit D(m−1)' and the operation flag is left down, OR
  (iii) valid bit Dm' and the operation flag is rotate right, B1. Data to be transferred from memory cell D(m−1) to Dm if
  (i) valid bit Vm" and the operation flag is rightdown, OR
  (ii) valid bit Vm' and valid bit V(m+1)" and the operation flag is rotate left, C1. Data to be transferred from memory cell D(m+1) to Dm if
  (i) valid bit V(m+1)' AND
  (ii) valid bit V(m+2)" AND
  (iii) operation flag rotate left or operation flag left up, D1. Data to be transferred from memory cell D(m+2) to Dm if
(i) operation flag up OR
(ii) valid bit V(m+2) AND (operation bit left down or rotate left), E1. Data to be transferred from memory cell Dm to Dm (i.e., data in the memory cell Dm stays the same) otherwise.

Thus, the Algorithm 2 specifies various conditions for transfer of data to the memory cell Dm during a given clock cycle. For example, the condition A1 of the Algorithm 2 specifies that data is to be transferred from the memory cell D(m−2) to the memory cell Dm if (i) the operation flag is down, OR (ii) valid bit (Dm−1)' (i.e., the valid bit D(m−1) indicates that the corresponding memory cell D(m−1) stores valid data) and the operation flag is left down, OR (iii) valid bit Dm' and the operation flag is rotate right. The value of the operation flag is determined from the table 200 of FIG. 2. Similarly, the conditions B1, C1, D1 and E1 of the Algorithm 2 specifies various other conditions for transfer of data from various memory cells to the memory cell Dm.

As previously discussed, Algorithms 1 and 2 can be generalized for any appropriate value of m, e.g., m=1, 2, ..., N. However, when m is, for example, 1, the Algorithms 1 and 2 refer to D(1−2), i.e., D(−1) and also refers to D(1−3), i.e., D(−2), although memory cells D(−1) and D(−2) do not exist in the queue 14. For D(−1), data to be transferred is considered to be data that is input to the queue 14 using a left push command. For D(−2), data to be transferred is considered to be data that is input to the queue 14 using a right push command. Also, the accompanying valid bits V(−1) and V(−2) are assumed to be asserted (i.e., V(−1)' and V(−2)').

Similarly, when m is, for example, N, the Algorithms 1 and 2 refer to D(N+1), and D(N+2), although such memory cells do not exist in the queue 14. When implementing the Algorithms 1 and 2, data in the memory cells are implemented using a don't care condition for memory cells D(N+1) and D(N+2), and the accompanying valid bits V(N+1) and V(N+2) are assumed to be de-asserted.

Figure 4D:
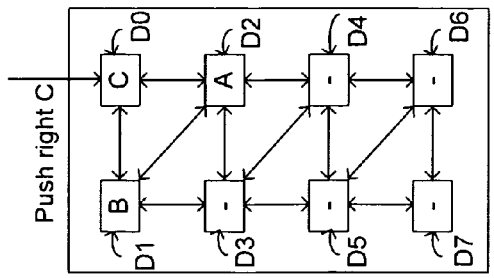
FIGS. 4A-4R illustrate example transmissions of data in various memory cells of the queue of FIG. 1.
Figure 4H:
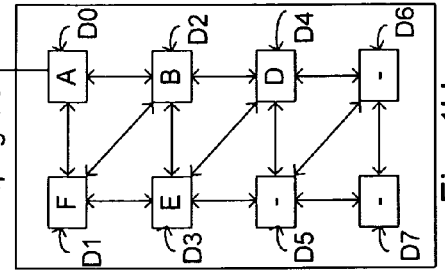
Figure 4C:
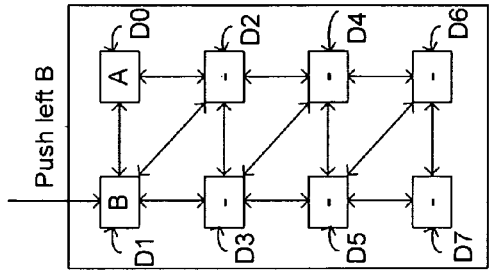
Figure 4G:
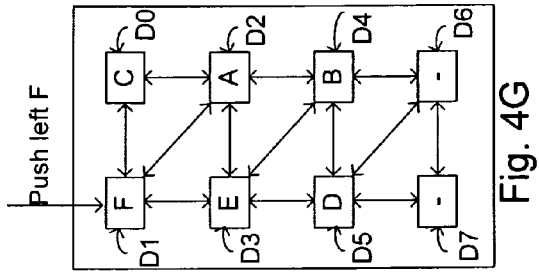

In an embodiment, data is transferred in and out of the queue 14 (or within the memory cells of the queue 14) in form of data packets or data bits. FIGS. 4A-4R illustrate example transmission of data in various memory cells of the queue 14. In FIGS. 4A-4R, the data is labeled as A, B, F, where ones of A, B, F, represents a single bit data, a multi-bit data, one or more data packets, or any other appropriate form of data. Also, in FIGS. 4A-4R, the queue 14 is illustrated to have only 8 example memory cells (i.e., memory cells D0, ..., D7), although such a number does not limit the scope of this disclosure. Ones of the FIGS. 4A-4R correspond to a corresponding clock cycle. For example, FIG. 4A corresponds to the state of the queue 14 during a first clock cycle, FIG. 4B corresponds to the state of the queue 14 during a second clock cycle that is subsequent to the first clock cycle, FIG. 4C corresponds to the state of the queue 14 during a third clock cycle that is subsequent to the second clock cycle, and so on.

Referring to FIG. 4A, during the first clock cycle, the queue 14 is at a reset state, i.e., all the memory cells of the queue 14 are empty and the respective valid bits of the memory cells are de-asserted. In FIGS. 4A-4R, empty memory cells are illustrated using a dash ("-") within the memory cell.

Figure 4B:
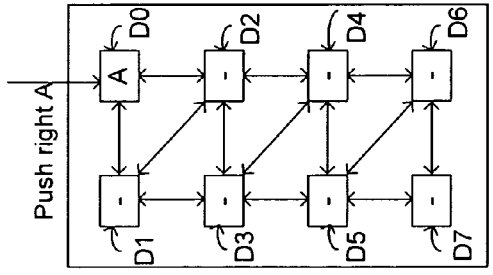
Figure 4F:
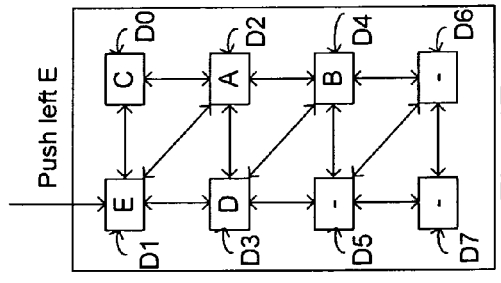
Figure 4A:
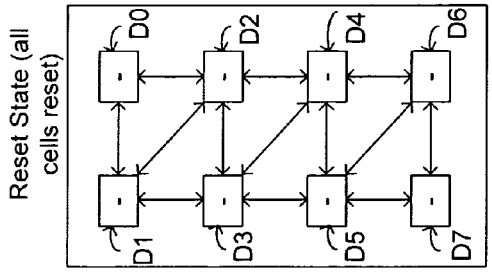

During the second clock cycle, as illustrated in FIG. 4B, data A is input to the queue 14 using a push right command. Thus, data A is received by the memory cell D0. During the third clock cycle, as illustrated in FIG. 4C, data B is input to the queue 14 using a push left command. Thus, data B is received by the memory cell D1.

At FIG. 4D, data C is input to the queue 14 using a push right command. Prior to the data C being input to the memory cell D0, data A is transmitted from the memory cell D0 to D2, e.g., in accordance with the previously discussed Algorithm 1, as illustrated in FIG. 4D. For example, in FIG. 4D, the queue command is push right. As per row 3 of the table 200, the associated operation flag is right down. Furthermore, while the push right C command is executed in FIG. 4D, the valid bits V0 and V1 are asserted (i.e., valid bit V0' and valid bit V1'), and the other valid bits are de-asserted. According to the condition A(ii) of Algorithm 1, the data A is transferred from the memory cell D0 to the memory cell D2, as illustrated in FIG. 4D.

Figure 4E:
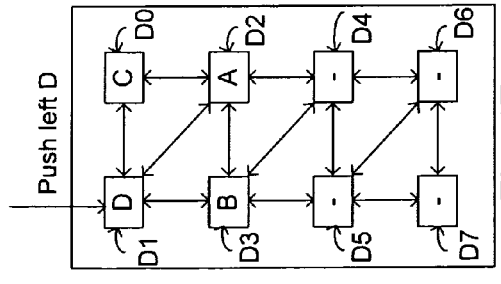
Figure 4L:
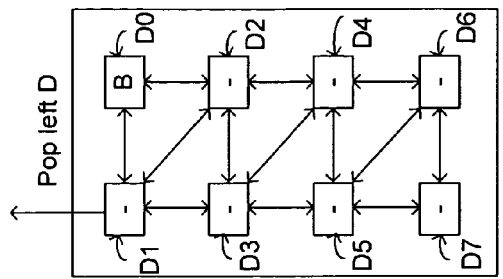
Figure 4P:
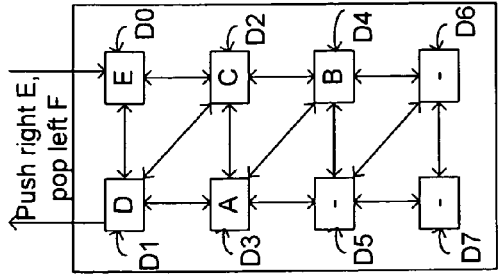
Figure 4K:
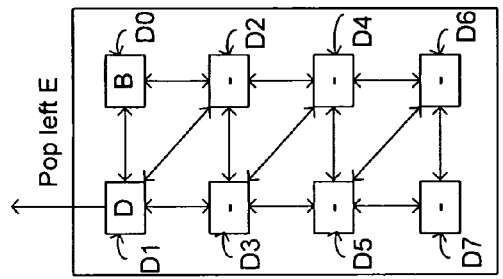
Figure 4O:
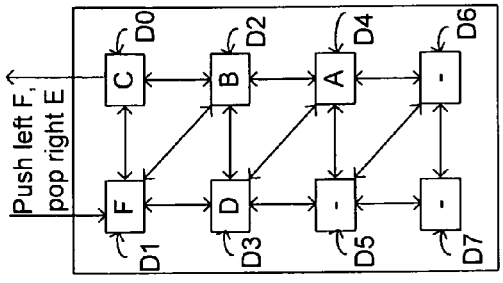
Figure 4J:
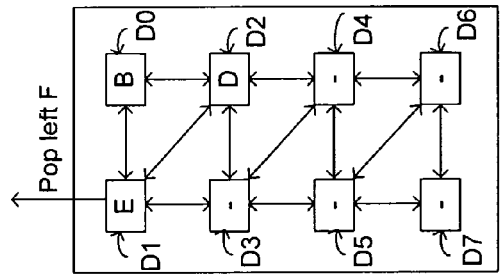
Figure 4N:
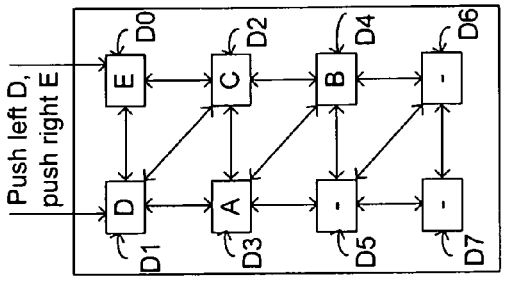
Figure 4I:
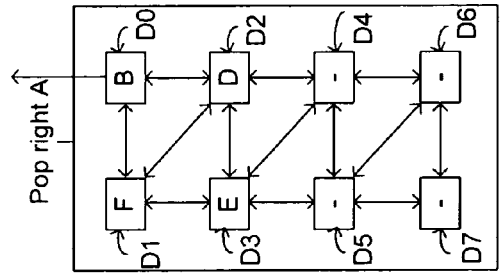
Figure 4M:
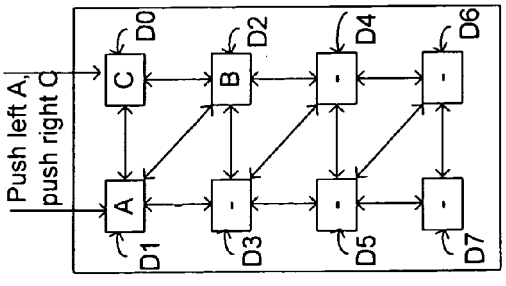
Figure 4R:
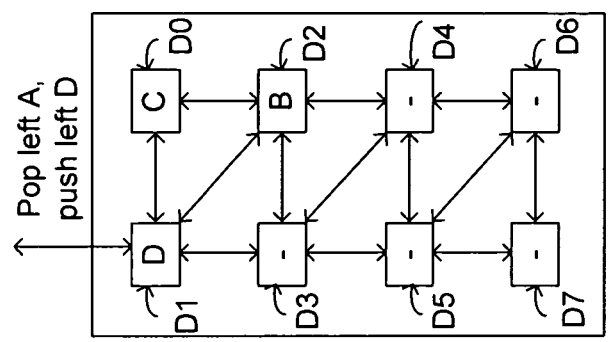
Figure 4Q:
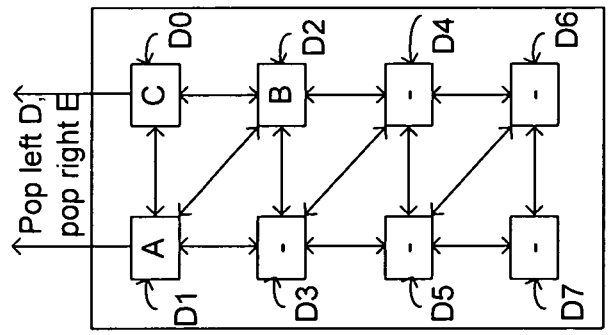

FIGS. 4E-4R similarly illustrate execution of various push right, push left, pop left and pop right commands, which are not discussed in detail for being self explanatory. As discussed, in FIGS. 4E-4R, the transmission of data between various memory cells of the queue 14 are based on the corresponding memory commands, the value of the operation flag, and the output of the Algorithms 1 and 2.

As illustrated in FIGS. 4B-4R, a memory cell, which is a last or lowermost occupied memory cell of a given column (i.e., the memory cell which is at the lowermost occupied level of the given column), transfers data either (i) upwards or downwards to another memory cell in the given column, or (ii) transfers data to a memory cell in a different column (e.g., based on Algorithm 1 or 2). For example, referring to FIG. 4E, the memory cell D3 includes data B, and the memory cell D3 is the last or lowermost occupied memory cell of the left column. In the next clock cycle, the data B can be transferred to the memory cell D1 or D5 of the left column, or to memory the cells D2 or D4 of the right column. In the example of FIG. 4F, the data B is transferred to the memory cell D4 of the right column.

On the other hand, a memory cell, which is not the last or lowermost occupied memory cell of a given column, transfers data either upwards or downwards to another memory cell in the given column (but not transfer data to a memory cell of a different column). For example, referring to FIG. 4G, the memory cell D2 includes data A, and the memory cell D2 is not the last or lowermost occupied memory cell of the right column. In the next clock cycle, the data A can be transferred to memory cell D0 or D4 of the right column (but cannot be transferred to the memory cells D1 or D3 of the left column). In the example of FIG. 4H, the data A is transferred to the memory cell D0 of the right column.

In FIGS. 4B-4G, data A, B, C, D, E and F are consecutively input to the queue 14 using, for example, push right and push left commands. That is, data A, B, C, D, E and F are input to the queue in that order (i.e., data A is input first, followed by data B, followed by data C, and so on, as illustrated in FIGS. 4B-4G). However, as illustrated in FIGS. 4H-4L, data C, A, F, E and D are output by the queue 14 in that order (i.e., data C is output first, followed by data A, followed by data F, and so on). That is, an order in which data is output by the queue 14 (i.e., C, A, F, E and D) is different from an order in which data was input in the queue 14 (i.e., A, B, C, D, E and F). That is, due to the arrangement and interconnections of the memory cells within the queue 14, due to transmission of data between various memory cells of the queue 14, and due to the combination of the push/pop and right/left commands, the order at which data is output from the queue 14 can be controlled. For example, in FIGS. 4H-4L, data is output from the queue 14 in the order that is different from the order in which data was input in the queue 14. Thus, in an embodiment, the queue 14 can be configured to operate as a FIFO queue, a LIFO queue, or a hybrid queue in which data can be output in any appropriate order. For example, an order in which a data packet is output is based on whether the data packet entered the queue 14 in the memory cell D0 and the memory cell D1. Thus, by controlling the memory cell (i.e., memory cell D0 or D1) in which a data packet is input to the queue, a behavior of the queue (i.e., whether the queue operates as a FIFO queue, a LIFO queue, or a hybrid queue) can be configured. In contrast, a conventional queue can be configured to operation solely as a FIFO queue, or solely as a LIFO queue.

The ordering of data in the queue 14 can be controlled, for example, by controlling the queue commands (e.g., the push right command, push left command, pop right command, and the pop left command). For example, if data C is to be input to the queue 14, the data C can be input using a push right C command (e.g., as in FIG. 4D), or a push left C command. The specific command used to enter the data C in the queue determines, for example, an order in which the data C is transmitted between various memory cells of the queue 14 (and hence, determines an order in which data C is eventually output by the queue 14, relative to other data).

In an embodiment, the previously discussed Algorithms 1 and 2 ensures, for example, that if there is data in more than two memory cells of the queue 14 (e.g., in memory cells D0 and D1), then each subsequent push operation causes data to be moved down in the queue 14, so as to maintain data in memory cells D0 and D1 respectively. Also, as illustrated in FIGS. 4A-4R, if an even number of memory cells of the queue 14 are filed with data and there is a push command, data is moved and/or selectively rotated such that one of the columns has a higher number of memory cells filed with data compared to that in another of the columns. Furthermore, if an odd number of memory cells are filed with data and there is a push command, data is moved and/or selectively rotated such that each column has equal number of memory cells that are filed with data. The queue demonstrates a similar behavior for pop commands as well.

Figure 5:
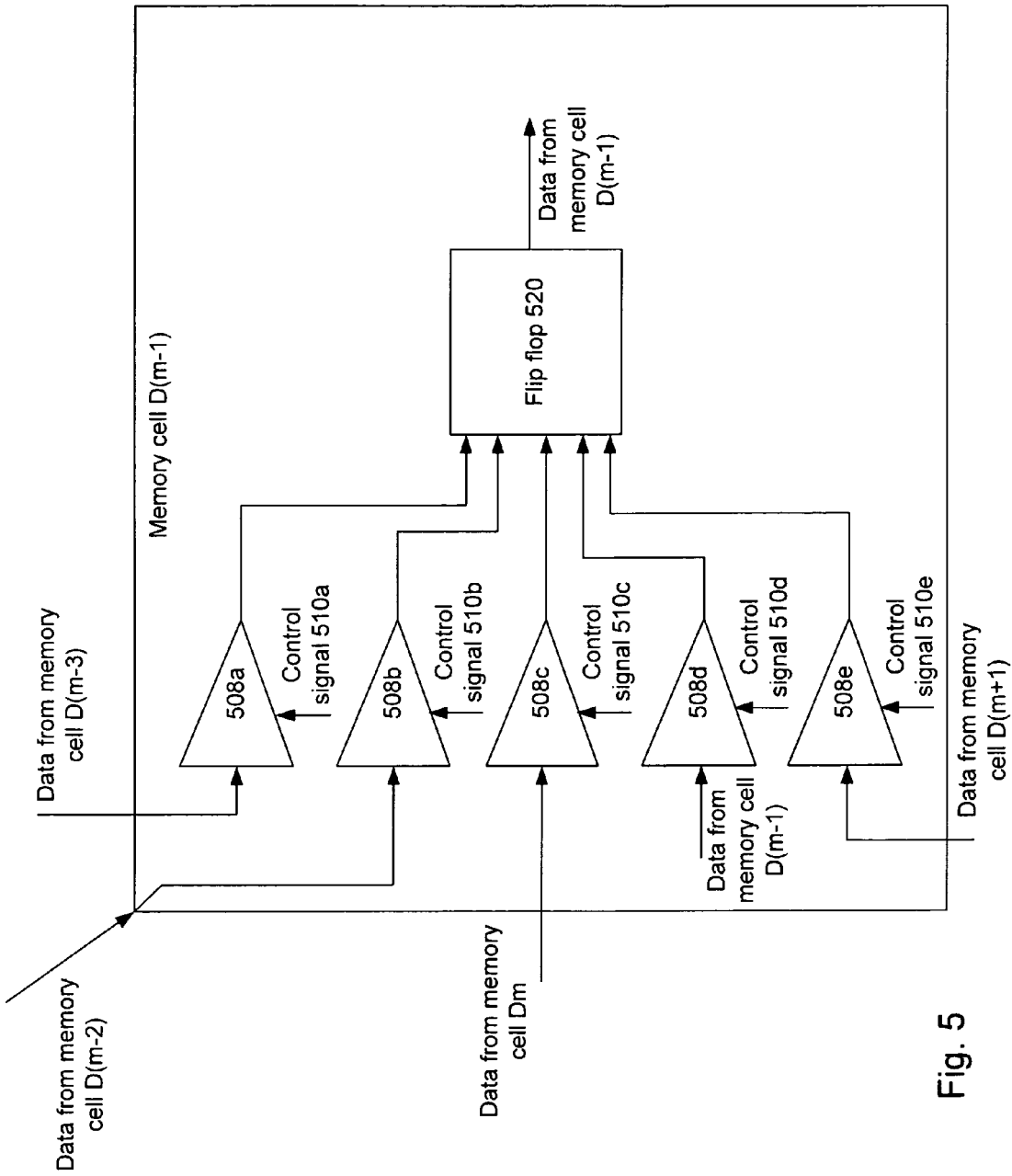
FIG. 5 schematically illustrates an example implementation of a memory cell of the queue of FIGS. 1 and 3.

FIG. 5 schematically illustrates an example implementation of a memory cell D(m−1) of the queue 14 of FIGS. 1 and 3. The memory cell D(m−1) is included in the right column of the queue 14. The memory cell D(m−1) includes control logic 508a, 508b, 508c, 508d and 508e. The control logic 508a, 508b, 508c, 508d and 508e can be implemented using, for example, operational amplifiers, switches, etc. The control logic 508a, 508b, 508c, 508d and 508e respectively receive data from the memory cell D(m−3), data from the memory cell D(m−2), data from the memory cell Dm, data from the memory cell D(m−1) (i.e., data of the previous clock cycle and from the same memory cell), and data from the memory cell D(m+1). In an embodiment, the control logic 508a, 508b, 508c, 508d and 508e are respectively controlled by control signals 510a, 510b, 510c, 510d and 510e, which are generated by, for example, the queue control module 18. In an example, the control signals 510a, 510b, 510c, 510d and 510e are generated based on the previously discussed Algorithm 1 (e.g., as the memory cell D(m−1) is in the right column of the queue 14, the Algorithm 1 is applicable for the memory cell D(m−1)). The memory cell D(m−1) also includes a flip flop 520 configured to receive outputs from ones of the control logic 508a, 508b, 508c, 508d and 508e.

During operation, only one of the control logic 508a, 508b, 508c, 508d and 508e is activated, based on the control signals 510a, 510b, 510c, 510d and 510e. For example, if, according to the Algorithm 1, the memory cell D(m−1) is to receive data from the memory cell D(m−2), then the control signal 510b activates the control logic 508b, such that data from the memory cell D(m−2) is transmitted to the flip flop 502. Thus, during a given clock cycle, by selectively activating only one of the control logic 508a, 508b, 508c, 508d and 508e, data is transferred from one of the memory cells to the memory cell D(m−1). The flip flop 520 outputs data of the memory cell D(m−1) for the next clock cycle.

In an embodiment and although not illustrated in FIG. 5, the control logic 508a, 508b, 508c, 508d and 508e can be combined to form a single multiplexer, which can be controlled by a control signal that is generated based on the Algorithm 1. Such a multiplexer can output data from one of the memory cells to the flip flop 520, based on the control signal.

Figure 6:
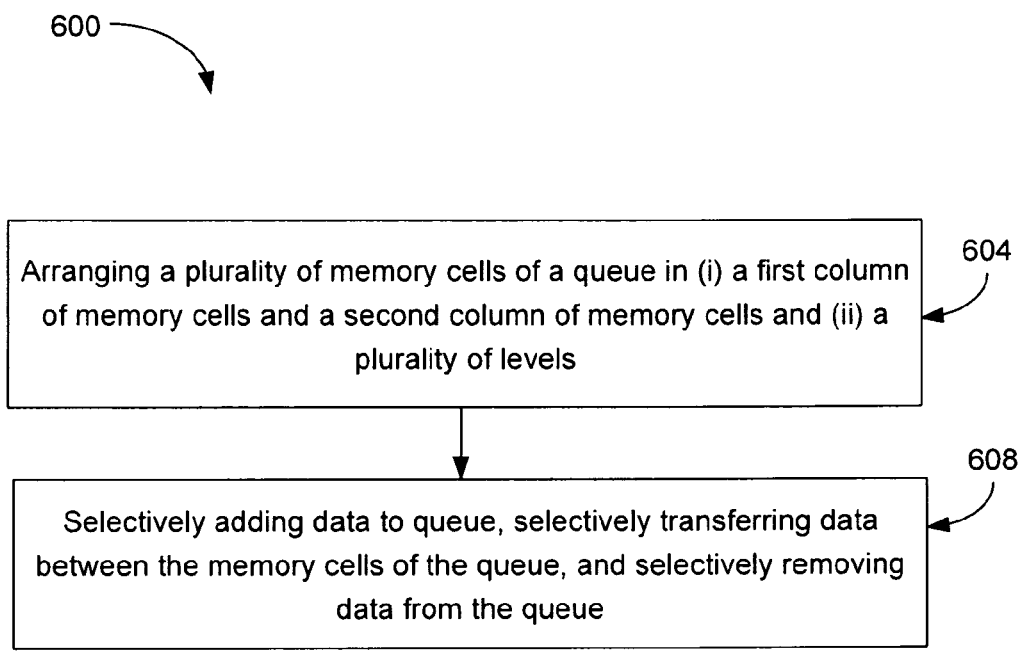
FIG. 6 illustrates an example method for forming and an operating a queue.

FIG. 6 illustrates an example method 600 for forming and operating a queue (e.g., the queue 14 of FIG. 1). At 604, a plurality of memory cells of a queue is arranged in (i) a first column of memory cells and a second column of memory cells and (ii) a plurality of levels. In an embodiment, ones of the levels include a corresponding memory cell of the first column and a corresponding memory cell of the second column. In an embodiment, a memory cell of the first column is coupled to at least (i) another memory cell of the first column that is at a different level than a level of the memory cell of the first column and (ii) another memory cell of the second column that is at a same or a different level than the level of the memory cell of the first column. At 608, data is selectively added to queue, selectively transferred data between the memory cells of the queue, and selectively removed from the queue.

In accordance with various embodiments, an article of manufacture may be provided that includes a storage medium having instructions stored thereon that, if executed, result in the operations described herein with respect to the method 600 (e.g. operation at 608 of the method 600) and/or various other operations discussed in the present disclosure. In an embodiment, the storage medium comprises some type of non-transitory memory (not shown). In accordance with various embodiments, the article of manufacture may be a computer-readable medium such as, for example, software or firmware.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This disclosure is intended to cover any adaptations or variations of the embodiment disclosed herein. Therefore, it is manifested and intended that the present disclosure be limited only by the claims and the equivalents thereof.

What is claimed is:

1. A queue comprising:
   a plurality of memory cells arranged in a first column of memory cells and a second column of memory cells, the plurality of memory cells also arranged in a plurality of levels, such that ones of the levels include a corresponding memory cell of the first column and a corresponding memory cell of the second column, and such that a memory cell of the first column is coupled to at least (i) another memory cell of the first column that is at a different level than a level of the memory cell of the first column and (ii) another memory cell of the second column that is at a same or a different level than the level of the memory cell of the first column; and
   a control module configured to selectively add data to the queue, selectively remove data from the queue, and selectively transfer data between the memory cells of the queue.

2. The queue of claim 1, wherein the control module is further configured to:
   selectively add first data to the queue by adding the first data to a first memory cell of the first column and of a first level; and
   transfer the first data from the first memory cell of the first column to either (i) a second memory cell of the first column that is at a lower level compared to the first level, or (ii) to a memory cell in the second column that is at the first level or at a different level.

3. The queue of claim 2, wherein the control module is further configured to:
   selectively add second data to the queue by adding the second data to a first memory cell of the second column and the first level; and
   transfer the second data from the first memory cell of the second column to either (i) a second memory cell of the second column that is at a lower level compared to the first level, or (ii) to the first memory cell of the first column.

4. The queue of claim 2, wherein the control module is further configured to:
   determine that the second memory cell of the first column and of a second level is a lowermost occupied memory cell of the first column; and
   based on determining that the second memory cell of the first column and of the second level is the lowermost occupied memory cell of the first column, transfer second data from the second memory cell of the first column and of the second level to either (i) a memory cell of the first column and of a level that is different from the second level, or (ii) a memory cell of the second column and of a level that is same or different from the second level.

5. The queue of claim 2, wherein the control module is further configured to:
   determine that the second memory cell of the first column and of a second level is not a lowermost occupied memory cell of the first column; and
   based on determining that the second memory cell of the first column and of the second level is not the lowermost occupied memory cell of the first column, transfer second data from the second memory cell of the first column and of the second level to a memory cell of the first column and of a level that is different from the second level.

6. The queue of claim 5, wherein the control module is further configured to:
   based on determining that the second memory cell of the first column and the second level is not the lowermost occupied memory cell of the first column, refrain from transferring the second data from the second memory cell of the first column and of the second level to a memory cell of the second column.

7. The queue of claim 1, wherein the control module is further configured to:
   selectively remove first data from a first memory cell of the first column and of a first level; and
   selectively remove second data from a first memory cell of the second column and of the first level.

8. The queue of claim 1, wherein the control module is further configured to:
   during a first clock cycle, perform one or more of (i) adding data to a first memory cell of the first column, (ii) adding data to a first memory cell of the second column, (iii) removing data from the first memory cell of the first column, and (iv) removing data from the first memory cell of the second column; and
   based on performing the one or more of (i) adding data to a first memory cell of the first column, (ii) adding data to a first memory cell of the second column, (iii) removing data from the first memory cell of the first column, and (iv) removing data from the first memory cell of the second column, determine a value of an operation flag.

9. The queue of claim 8, wherein the control module is further configured to:
   based on the value of the operation flag, transfer data between the memory cells of the queue.

10. The queue of claim 1, wherein:
    data is received in the queue in a first order;
    data is output from the queue in a second order; and
    the queue is configured such that the second order is one of (i) same as the first order, (ii) opposite to the first order, and (iii) neither same as the first order, nor opposite to the first order.

11. The queue of claim 1, wherein:
    the queue is included in a system on a chip (SoC); and
    the queue is configured to queue data packets received by the SoC over a network.

12. A method comprising:
    arranging a plurality of memory cells of a queue in (i) a first column of memory cells and a second column of memory cells and (ii) a plurality of levels, such that ones of the levels include a corresponding memory cell of the first column and a corresponding memory cell of the second column, and such that a memory cell of the first column is coupled to at least (i) another memory cell of the first column that is at a different level than a level of the memory cell of the first column and (ii) another memory cell of the second column that is at a same or a different level than the level of the memory cell of the first column;
    selectively adding data to the queue;
    selectively transferring data between the memory cells of the queue; and
    selectively removing data from the queue.

13. The method of claim 12, wherein selectively adding data and transferring data further comprises:
    selectively adding first data to the queue by adding the first data to a first memory cell of the first column and of a first level; and
    transferring the first data from the first memory cell of the first column to either (i) a second memory cell of the first column that is at a lower level compared to the first level, or (ii) to a memory cell in the second column that is at the first level or at a different level.

14. The method of claim 13, wherein selectively adding data and transferring data further comprises:
selectively adding second data to the queue by adding the second data to a first memory cell of the second column and the first level; and
transferring the second data from the first memory cell of the second column to either (i) a second memory cell of the second column that is at a lower level compared to the first level, or (ii) to the first memory cell of the first column.

15. The method of claim 13, wherein selectively transferring data further comprises:
determining that the second memory cell of the first column and of a second level is a lowermost occupied memory cell of the first column; and
based on determining that the second memory cell of the first column and of the second level is the lowermost occupied memory cell of the first column, transferring second data from the second memory cell of the first column and of the second level to either (i) a memory cell of the first column and of a level that is different from the second level, or (ii) a memory cell of the second column and of a level that is same or different from the second level.

16. The method of claim 13, wherein selectively transferring data further comprises:
determining that the second memory cell of the first column and of a second level is not a lowermost occupied memory cell of the first column; and
based on determining that the second memory cell of the first column and of the second level is not the lowermost occupied memory cell of the first column, transferring second data from the second memory cell of the first column and of the second level to a memory cell of the first column and of a level that is different from the second level.

17. The method of claim 16, further comprising:
based on determining that the second memory cell of the first column and the second level is not the lowermost occupied memory cell of the first column, refraining from transferring the second data from the second memory cell of the first column and of the second level to a memory cell of the second column.

18. The method of claim 12, wherein selectively removing data further comprises:
selectively removing first data from a first memory cell of the first column and of a first level; and
selectively removing second data from a first memory cell of the second column and of the first level.

19. The method of claim 12, further comprising:
during a first clock cycle, performing one or more of (i) adding data to a first memory cell of the first column, (ii) adding data to a first memory cell of the second column, (iii) removing data from the first memory cell of the first column, and (iv) removing data from the first memory cell of the second column; and
based on performing the one or more of (i) adding data to a first memory cell of the first column, (ii) adding data to a first memory cell of the second column, (iii) removing data from the first memory cell of the first column, and (iv) removing data from the first memory cell of the second column, determining a value of an operation flag.

20. The method of claim 19, wherein selectively transferring data further comprises:
based on the value of the operation flag, transferring data between the memory cells of the queue.

* * * * *